INVENTORS
ROGER L. BORN
EDWIN B. NEITZEL
ERNEST F. VIGIL

ATTORNEY

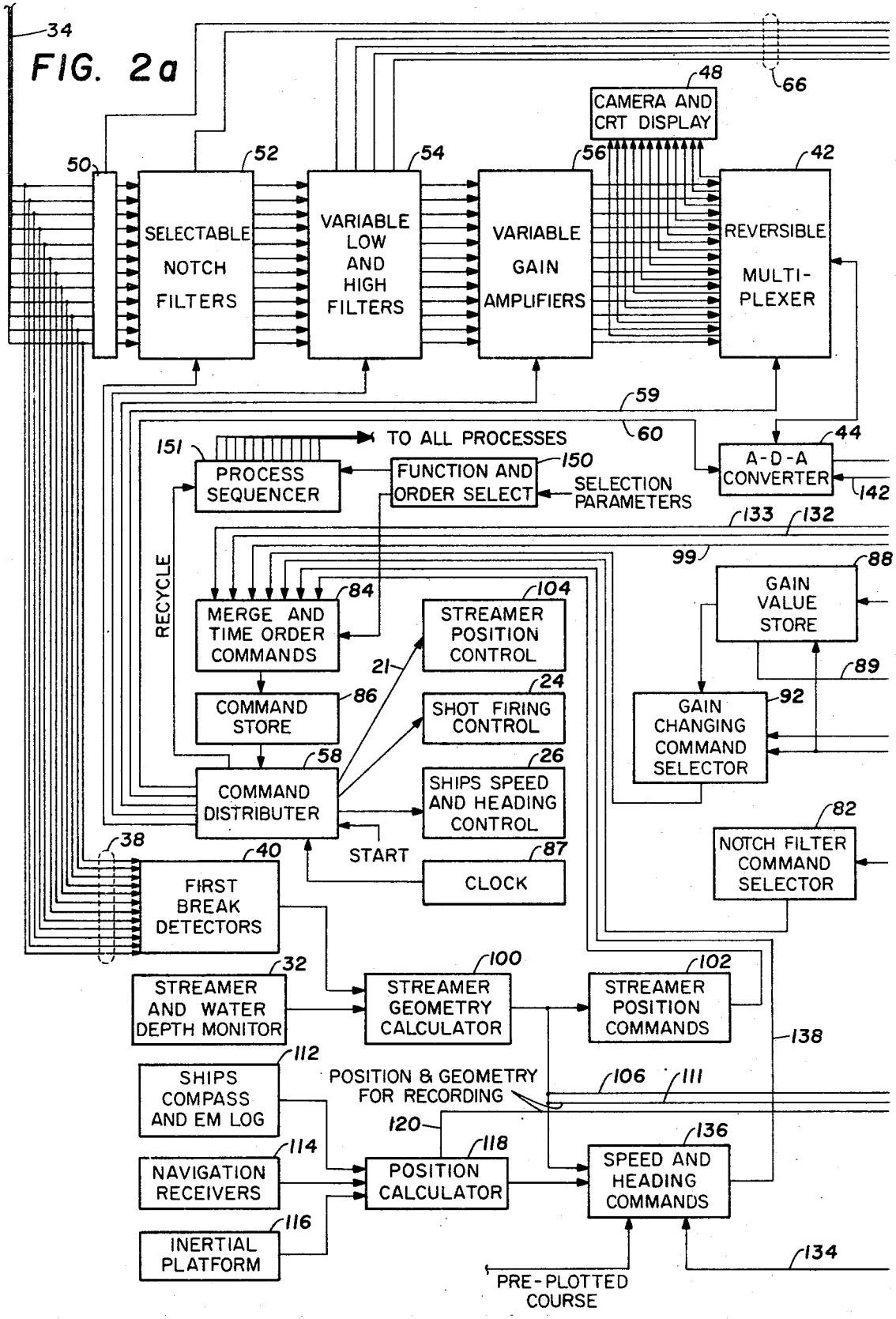

United States Patent Office 3,525,072
Patented Aug. 18, 1970

3,525,072
METHOD AND APPARATUS FOR PROCESSING SEISMIC DATA IN THE FIELD
Roger L. Born, Edwin B. Neitzel, and Ernest F. Vigil, Dallas, Tex., assignors to Texas Instruments Incorporated, Dallas, Tex., a corporation of Delaware
Filed Dec. 11, 1967, Ser. No. 689,448
Int. Cl. G01v 1/28
U.S. Cl. 340—15.5                          12 Claims

ABSTRACT OF THE DISCLOSURE

Analog signals generated in response to seismic disturbances are multiplexed into a single channel and converted into digital signals. A digital computer corrects and analyzes the digital signals, records data from the digital signals, and controls various physical characteristics of the analog signals in dependence upon the quality of the digital signals. Data is fed back through the converter and multiplexer systems for a real time analog display during the recording of data.

---

Figure 1:
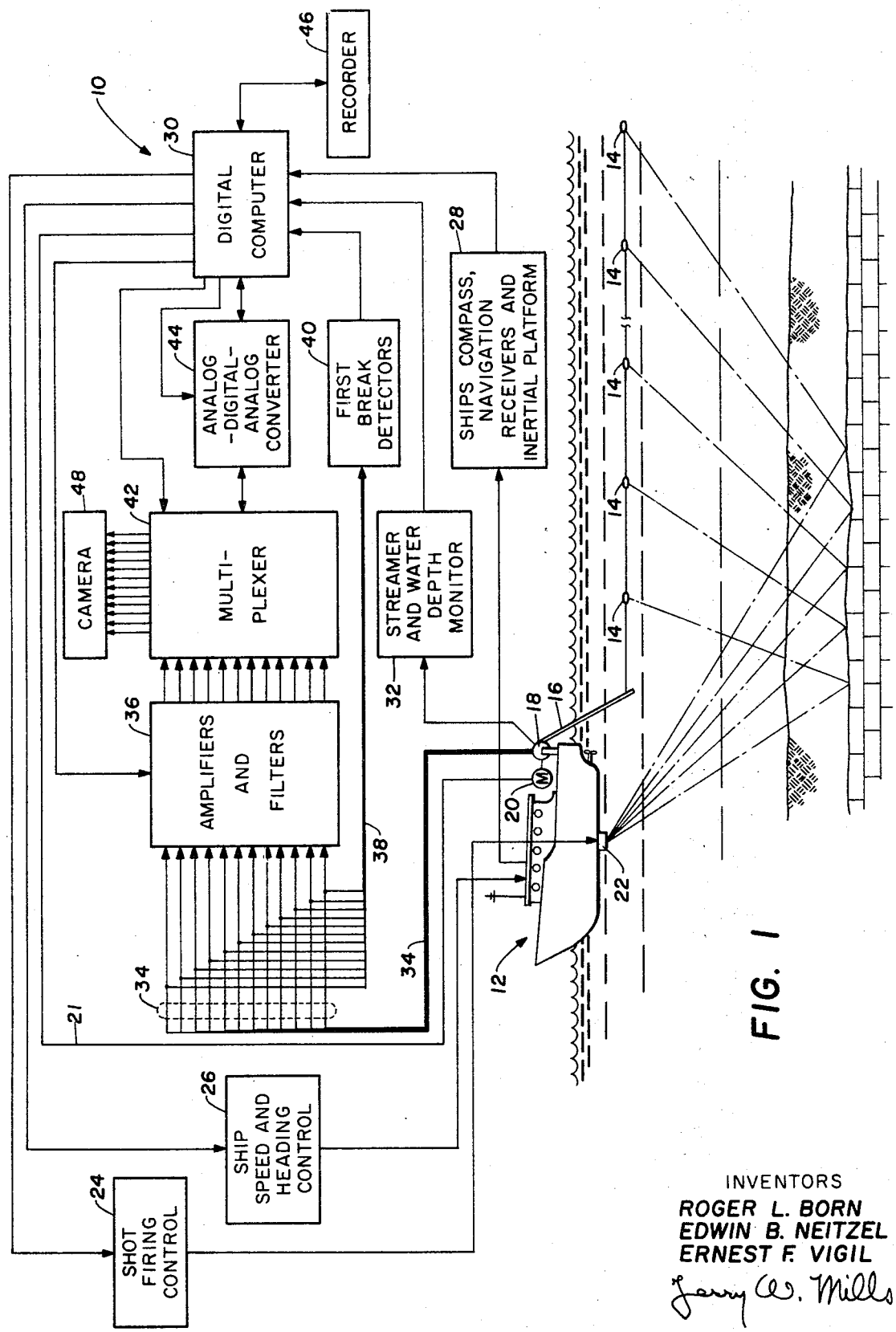

This invention relates to seismic exploration, and more particularly to a method and apparatus for seismic exploration wherein processing of seismic data may be conducted in the field.

It is a common practice in seismic exploration to generate seismic disturbances which travel through the earth in multiple paths and which are then reflected upwardly by earth layers such as strata interfaces. In seismic exploration conducted upon land surfaces, the seismic disturbances are usually generated by the detonation of explosive charges, and the reflected seismic disturbances are detected by arrays of seismometers located in the area of the seismic disturbance. In marine seismic exploration, the seismic disturbances may also be generated by the detonation of explosives by the prospecting vessel or by a nearby companion vessel, with the reflected seismic waves being received by a plurality of hydrophones streamed behind the prospecting vessel.

In either land or marine seismic exploration, the detected seismic waves are converted into electrical analog signals which are generally amplified, filtered, and then recorded. Personnel attached to the field exploration party make a preliminary analysis of the recorded analog data, the analysis including various corrections for normal moveout and the like. Such preliminary analysis conducted in the field is advantageous, in that directions can be provided to the seismic crew concerning desirable changes in the rate of the shooting and the relative spacing of the shots and the detectors. By making such changes in response to the quality of the received raw data, the quality of the new data can often be optimized.

However, it has long been desired to make a much more rapid and complete analysis of the recorded data in order to provide more accurate directions as how to best conduct the seismic exploration in view of the results being obtained. It has been suggested that this problem might be solved by rapidly telemetering the recorded seismic data to a remotely located central processing center which analyses the data.

An example of such a system is disclosed and described in U.S. Pat. No. 3,134,957, issued to Foote et al. on May 26, 1964. In the system disclosed by the Foote et al. patent, the analog seismic data is multiplexed into a single analog channel in the field, converted into digital form, and transmitted to a remotely located processing center. However, problems have arisen in the transmitting of digital data from remotely disposed stations. A more common procedure is thus to record the raw seismic data and to physically transport the recording to the central processing station. The digital data is received at the central station and fed into a digital computer, wherein a detailed data analysis is performed and recorded. The digital data is then reconverted into analog form and displayed at the central processing station in order to permit interpretation personnel to monitor the seismic data. The interpretation personnel may then direct the crew to make rough manual adjustments to the exploration system. However, due to the long time delay, which may be as much as several weeks, between the taking of the data and the transmittal of the instructions to the field crew, it is not usually possible to respond quickly enough to the changing quality of the data. As a result of this time delay, lines of shots often need to be reshot, or data of low quality is required to be used.

In addition, problems have often arisen with respect to the preciseness in which the various seismic exploration procedures are carried out. In the shooting of data, several operators concurrently control various aspects of the exploration. For instance, in marine exploration, one operator may control the shot rate, while several other operators calculate the position of the system and steer the vessel in accordance with the shooting rate. It is thus extremely difficult to properly coordinate the functions of all the operators in order to obtain precise excution of the seismic exploration. Further, the individual manual adjustments made by the operators are often not completely satisfactory with respect to accuracy or with respect to the frequency of control. It would thus be advantageous to quickly and automatically control various aspects of the exploration procedure from a central control.

In accordance with the present invention, reflected seismic analog signals are detected and converted into digital signals. A digital computer is located in the field and analyzes the converted digital signals. The analyzed digital signals are recorded and the computer supplies operational commands to the exploration systems in accordance with the quality of the analyzed digital data. These commands result in automatic variations in characteristics of the field system in order to improve the quality of the seismic data. The various operations of the exploration are thus centrally controlled, resulting in very precise operation of the system, which will further enhance the quality of the data. Additionally, a substantially real time visual display of the analyzed seismic data in analog form may be provided to the field crew personel without interrupting the recording of new seismic data.

Figure 2B:
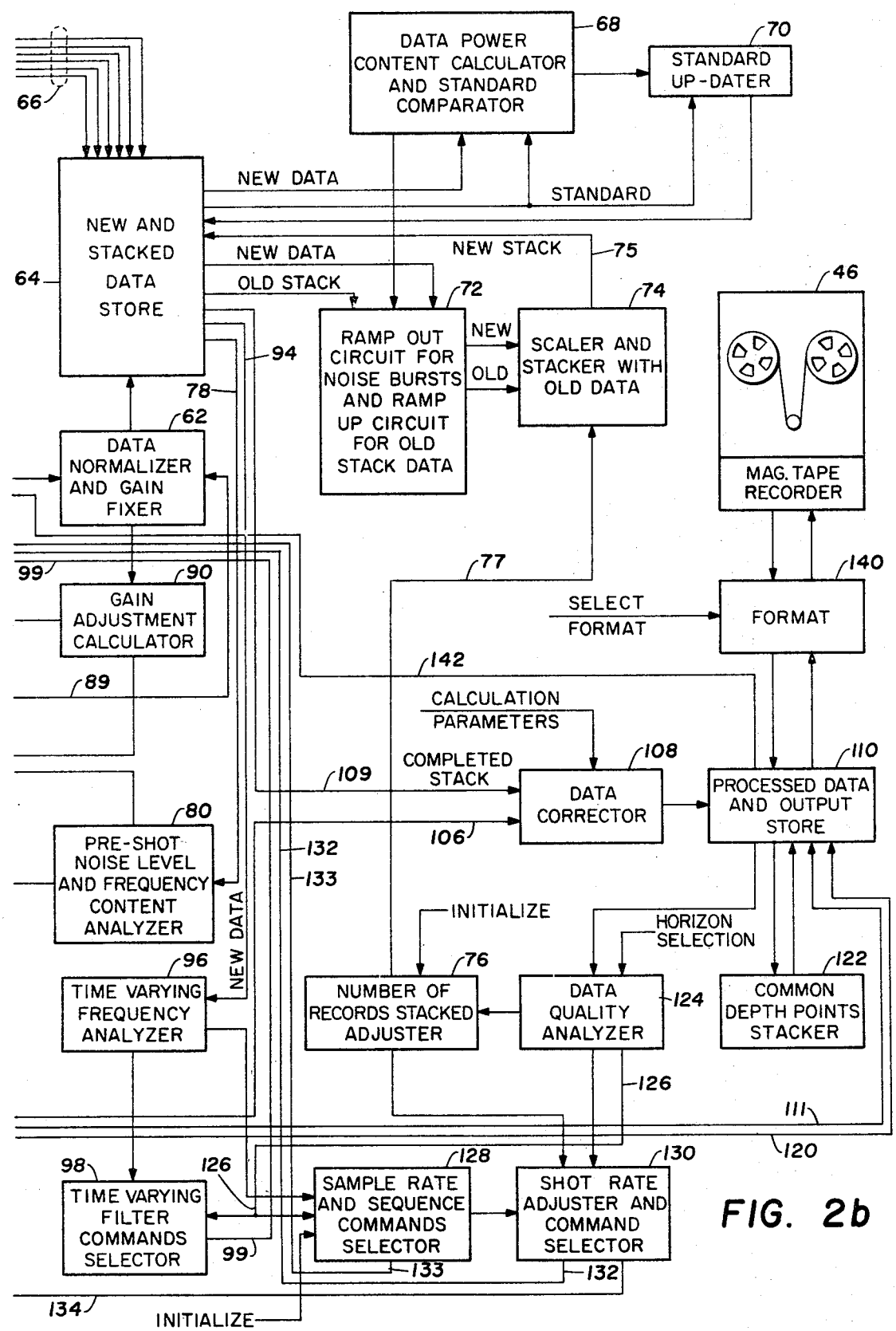

For a more complete understanding of the present invention and for further objects and advantages thereof, reference may now be had to the following description taken in conjunction with the accompanying drawings in which:

FIG. 1 is a block diagram of the invention embodied in a marine exploration system; and FIGS. 2a–2b are interrelated detailed block diagrams of a portion of the circuitry illustrated in FIG. 1, including a flow diagram of functions accomplished by a properly programmed digital computer.

Referring to FIG. 1, a self-contained marine seismic exploration system is designated generally by the numeral 10. A vessel 12 tows a streamer having a plurality of seismic detectors, or hydrophones, 14. The relative depth of the streamer is controlled by the position of the depth controller member 16 and by the reel 18. The member 16 and the reel 18 are operated by a suitable motor 20, which in turn is selectively actuated by signals applied through a conductor 21. If desired, the depth of the streamer might be controlled by varying the ballast of the streamer. Seismic impulses are generated from the vesesl 12 by operation of a shot generator 22.

The generator 22 may comprise an explosion chamber, a motor driven diaphragm, or a chamber from which pressurized gas is released in sufficient quantities to generate seismic impulses. The rate at which the generator 22 generates a seismic signal is controlled by shot firing control circuitry 24. It will be understood that the shot generator 22 may be mounted on a companion vessel operating near vessel 12, if desired. The generated seismic waves pass downwardly through the water and are reflected upwardly to the detectors 14 by earth layers, which may be interfaces between two different earth strata.

The speed and the heading of the vessel 12 is controlled by guidance control circuitry in the speed and heading control system 26. Alternatively, the control system 26 may visually display percise guidance instructions to the helmsman. A plurality of monitors 28 are carried aboard the vessel 12 for providing indications of the position of the vessel to a digital computer 30. These monitors include the ship's compass, navigation receiver, the EM (ship velocity) log and an inertial platform. A streamer and water depth monitor 32 provides indications to the digital computer 30 of the depth of the water being surveyed and of the depth of various locations along the streamer.

The detectors 14 convert the seismic impulses reflected from sub-surface strata into electrical signals which are fed through a cable 34 to an amplification and filtering system 36. In the drawing, twelve output channels have been illustrated, although it will be understood that for many applications of the invention a much larger number of data channels will be provided. Indications of the first break of the detected seismic data are picked off the channels in cable 34, and passed through a cable 38 to a plurality of first break detectors 40. Dectectors 40 provide first arrival information to the digital computer 30.

The amplified and filtered analog seismic signals are fed to a multiplexer 42, where they are converted into a single channel of analog signals and fed to the input of an analog-to-digital converter 44. The multiplexer 42 may comprise circuitry similar to the multiplexer discolsed in the previously identified Foote et al. patent, with the addition of channel selection and sequencing controls and providing either multiplexing or demultiplexing as desired.

The analog to digital converter 44 may also be constructed generally in accordance with the converter disclosed in the Foote et al. patent, with control allowing sequential operation of the converter 44 from analog-to-digital and from digital-to-analog, as desired. The digital computer 30 may comprise a special purpose digital computer as generally disclosed in the Foote et al. patent, or may alternatively comprise a general purpose computer having broad enough capabilities to perform the desired operations when properly programmed. Alternatively, special purpose hardware circuitry may be utilized to perform the desired digital processing.

After the digital seismic data has been analyzed by the digital computer 30, a permanent record of the analyzed digital data is made by the recorder 46. Additionally, indications of the physical characteristics of the exploration provided by the monitors 28, 32 and 40 may be interleaved with the analyzed digital data. As previously explained, it is also desirable to provide visual analog representations of the analyzed data on a substantially real time basis. This is accomplised by the present invention by replaying the recorded digital data from the recorder 46 through the digital computer 30 to the converter 44. The digital data is then converted to an analog channel by the converter 44 and is fed to the multiplexer 42, where the analog channel is demultiplexed into a plurality of parallel analog channels which are fed to a camera system 48. Camera 48 permanently records representations of each trace of the analog seismic data. If desired, a visual readout device, such as a cathode ray tube, may be provided along with the camera 48.

The feedback of the digital data through the computer 30, converter 44, and multiplexer 42 is intermittently performed with the passage of the raw seismic data from the multiplexer 42 and the converter 44 to the computer 30. Due to this intermittent processing of the raw seismic data with the feeding back of the processed data, the present system is able to provide a substantially real time display of the processed data while simultaneously processing new data.

As the digital computer 30 analyzes and processes the raw seismic data, the computer 30 also considers the position of the vessel 12 provided by the navigational monitoring system 28. Also, the geometry of the streamer towed behind the vessel is calculated by the computer 30 in response to the signals provided by the first break detectors 40 and the streamer depth monitor 32. By considering the quality of the analyzed digital data, in conjunction with the calculated streamer geometry and the ship position, the computer determines the optimum shot firing rate and provides commands to the shot firing control system 24 in order to properly operate the generator 22.

Additionally, the speed and heading of the vessel 12 is varied by the control system 26 in response to commands from the computer 30. The depth of the streamer is also controlled by actuation of the motor 20 by the computer 30 in response to the quality of the data being processed and the calculated streamer geometry. The computer 30 additionally performs analysis of the frequency and amplitude of the data being considered, and automatically varies these characteristics of the incoming analog signal as needed, by tuning of the amplifiers and filters 36.

It will thus be understood that the invention provides a self-contained seismic exploration system wherein seismic data may be rapidly processed and recorded, while physical characteristics of the system are automatically varied in response to the quality of the data being processed. Although the invention has been disclosed with respect to the marine seismic exploration system in FIG. 1, it will be understood that the invention may also be advantageously utilized in a land based seismic exploration system. In such a land operation, the system would operate in a similar manner as shown, except that monitoring of the geometry of the seismometers would not be required.

FIGS. 2a and 2b illustrate in interrelated block form a complete system including a flow diagram of functions accomplished by a properly programmed digital computer, for processing seismic data in the field, and for simultaneously providing commands in order to automate certain of the exploration procedures. It will be apparent that many of the functions provided by the illustrated circuitry may be performed by a properly programmed digital computer. To assist in the understanding of the circuitry, FIGS. 2a and 2b may be aligned so that the various circuit and flow diagram interconnections are matched.

Raw seismic data is supplied to the circuitry through the cable 34 previously described and passed through a plurality of matching circuits and amplifiers 50 to a plurality of selectable notch filters 52. In the embodiment illustrated, twelve channels of analog data have been shown. However, it will be understood that a far greater number of channels will be ordinarily utilized in order to provide meaningful seismic information. For instance, the present system may be expanded to 192 channels by adding on the required additional number of filters and amplifiers.

The operation of the notch filters 52 is variable in order to selectively eliminate low frequency noise, such as 60 cycles per second, from the raw seismic data. Each of the analog seismic signals is fed through variable low and high filters 54 to variable gain amplifiers 56. The bandpass of the filters 54 is selectively variable in order to adjust the frequency spectrum of the incoming seismic signal for various desired processing results. The variable gain amplifiers 56 amplify each of the analog seismic signal channels with gain determined by the processing circuitry to be later described. The operation of the filters 52 and 54 and the amplifiers 56 is directly controlled in accordance with a command distributor 58.

The command distributor 58 may comprise any of a number of suitable sequencing control circuits, with one embodiment comprising an interconnected precision oscillator, decrementing register and data register. A least significant part of the data register is connected to a bus that is connected to a majority of the circuitry in the system. The most significant part of the data register is fed into a translator which selects one output from a plurality of possible outputs to the control circuitry. When the decrementing register reaches a zero level, a strobe pulse is generated upon the selected output. The strobe pulse causes the control equipment connected to the selected output to gate the data off the bus connected to the particular equipment and into the data register.

The data contains the operational command for the control equipment and becomes effective as soon as the strobe pulse ceases. The output of the strobe pulse from the decrementing register also initiates a request for a new data word from a memory storage. The new data word will be permitted to enter the data register as soon as the strobe pulse drops. This new word is immediately put upon the bus, translated and strobed as previously described. This procedure will continue until the list of data words is depleted, or until the decrementing register is set to a non-zero condition. The command data list provided to the command distributor 58 is provided by portions of the digital computer circuitry to be later described.

The variable gain amplifiers 56 may comprise binary amplifiers wherein commands from the command distributor 58 operate a gain register which selects the proper combination of amplifiers to effect the desired gain. Additionally, the filters 54 may be connected into the desired filter combinations by suitable filter and balance registers responsive to command signals from the distributor 58.

The amplified and filtered analog signals are fed into the input of a reversible multiplexer 42 which places the plurality of analog channels on one output analog channel which is then fed to the analog-to-digital converter 44. Multiplex 42 comprises a set of analog switches which are equal to the number of input channels, each of the switches being controlled by a suitable decoding network. The decoding network will be controlled by the command distributor 58 through lead 59.

Multiplexer 42 is reversible, either utilizing bidirectional switches or using another set of multiplexer switches associated with the camera and cathode ray tube display 48. This second set of switches would enable the multiplexer 42 to demultiplex a single channel of analog information into a plurality of analog channels which are then displayed by the camera system 48. The two sets of multiplexing switches are synchronized in operation by commands from the command distributor 58, so that both multiplexing and demultiplexing operations may be accomplished during the recording of data in the field.

A complete quality assurance check of the system may thus be provided by the camera system 48 for every record run. This continuous reversible operation of the multiplexer 42 allows essentially a real time operation of the display system and thus eliminates time consuming "dead-time" operation of the total system.

Operation of the converter 44 is controlled through conductor 60 by the command distributor 58. The converter 44 will convert an analog signal sample into a digital word 15 bits in length during a given time period, such as 31.25 microseconds. The analog-to-digital portion of converter 44 comprises a set of switches controlling a voltage ladder with a precise reference voltage. A digital register contains the word as it develops and a comparator compares the ladder voltage with the stored input voltage. A control section synchronizes the conversion process. The input voltage is stored so that it becomes a reference voltage, and the ladder voltage is made identical to the stored voltage by control of the set of switches. The position of the switches are indicated by the state of flip-flop circuits in the digit register which provides the correct digital number. The digital-to-analog function of converter 44 is accomplished in the reverse manner. The direction of operation of the converter 44 is controlled by the command distributor 58.

The output of the analog-to-digital operation of the converter 44 is applied to the input of the data normalizer and gain fixer circuit 62 (FIG. 2b). This circuit makes a floating point digital word by compacting the digital word and applying a gain which serves as a power-of-two exponent for the word. The output of circuit 62 is fed into a data store 64. Indications of the varied settings of the matching circuits and amplifiers 50, and the filters 52 and 54 are provided to the data store 64 via conductors 66. These settings are interleaved in the digital data for later recording. The new data just stored in date store 64 is fed to a data power content calculator and standard comparator 68.

A power standard is built from a set of power content tables derived from previous data and the standard is stored in the data store 64. The data power content calculator 68 calculates the power of the new data fed from the data store 64 and feeds these values to a standard updater 70 which provides a new standard to the data store 64. This power content is also compared with the previous standard. The output of the comparator 68 is utilized to control the operation of the ramp circuit 72.

Ramp circuit 72 ramps out, or lowers the gain according to a sloping function, portions of the incoming digital signal in which noise occurs. By lowering the gain of the signal according to the sloping function, the noise is substantially eliminated without the introduction of transients to the data. The ramp circuit 72 also utilizes the output provided by the comparator 68 to ramp up, or increase the amplitude according to a sloping function, portions of the old data.

The ramped old and new data from the ramp circuit 72 is fed into a scaler and stacker circuit 74, wherein the new data is stacked with the old data in a manner well known in the art. The data is scaled only if there is a relatively large number of stacks involved, in conjunction with restricted digital bit words. The stacked data is then fed back to the data store 64 via lead 75. The process of stacking is continued until an indication to terminate is provided by a stacking adjuster circuit 76 through the connection 77. Circuit 76 is initially controlled by input parameters, and then subsequently controlled in response to the quality of the analyzed digital data in a manner to be later described.

Data contained in the data store 64 is fed through a connection 78 to a frequency content analyzer circuit 80. Circuit 80 is also utilized before the initiation of a record run to analyze the inherent noise level. The output from circuit 80 operates a notch filter command selector 80 (FIG. 2a) which provides a command signal to a merge and time order command circuit 84. This command signal is time sequenced and stored in a command store circuit 86. A clock 87 provides a time reference to the command distributor 58. The command distributor 58 sequences the stored commands from store circuit 86 in the manner previously described to select the suitable notch filter 52 in order to eliminate noise before actual recording is initiated.

An output from the pre-shoot noise level analyzer 80 is also fed to a gain value store 88 (FIG. 2a) in order to set gain values prior to shot recording. Gain values are provided by the gain value store 88 through connection 89 to the data normalizer and gain fixer 62. A signal indicating the channel in which a gain value has been set is fed to the command selector 92 in order to vary the gain of the amplifiers 56.

After the noise gain values are set and recording is begun, the gain adjustment calculator 90 provides outputs, when a gain change is required, to the gain value store 88 and to a gain changing command selector 92. The previously stored gain value in store 88 is changed to the new value from circuit 90, and the gain changing command selector 92 is provided with an indication of a new gain value. Selector 92 then provides a command to the merge and time order command circuit 84. This command is stored in command store 86 and subsequently utilized by the command distributor 58 in order to change the gain of the amplifiers 56.

Newly stacked data is also fed from the data store 64 through a connection 94 to a time varying frequency analyzer circuit 96. The analyzed frequency spectrum of the new data is fed to a time varying filter command selector 98, which supplies a command through connection 99 to the merge and time order command circuit 84. In the manner previously described, the command distributor 58 commands the selection of the suitable combination of filters 54 in order to obtain the desired optimum frequency spectrum.

It will thus be seen that control feedback loops have been described from the data store 64 to each of the filters 52 and 54 and to the variable gain amplifiers 56. The control feedback loop for the selectable notch filters 52 includes the connection 78, the analyzer circuit 80, the command selector 82, and the sequencing circuitry including the command distributor 58. The control feedback loop for the filters 54 includes the connection 94, the time varying frequency analyzer 96, the command selector 98, the connection 99 and the sequencing circuitry including the command distributor 58. Similarly, the control feedback circuit for the variable gain amplifiers 56 includes the gain fixer 62, the gain calculator 90, the gain value store 88, the noise analyzer circuit 80, the command selector 92, and the time order circuitry of the command distributor 58.

Indications of the first arrivals of raw seismic data through cable 34 are provided by the first break detectors 40 (FIG. 2a), previously described. These indications are combined with the signals from the monitors 32 which determine the depth of the streamer carrying the hydrophones 14 and are fed to a streamer geometry calculator 100. Calculator 100 provides an indication of the relative linearity and depth of the streamer being towed by the vessel 12. Calculator 100 operates a streamer position command circuit 102 which provides signals to the merge and time order command circuit 84, which are stored in store circuit 86 and fed into the command distributor 58. Command distributor 58 sequentially provides control signals through the connection 21 to the streamer position control 104 in order to vary the depth of the streamer. Control 104 may comprise the motor 20 (FIG. 1), which operates the reel 18.

Indications of the streamer geometry are also provided through lead 106 to one input of a data corrector 108 (FIG. 2b). Calculation parameters are input into the data corrector 108, along with data from connection 109 of the completed stack from the data store 64. The data corrector 108 then makes corrections to the stacked data. These corrections include corrections for amplitude variations, normal move-out, and for the geometry of the exploration system. In addition to the static corrections, corrections are also made for system response, reverberations, and for pilot signal removal. Each of these corrections is well known in the art, and variations and additions to the corrections will of course be possible. The corrected digital signals provided by the digital corrector 108 are fed into a processed data and output store 110. Indications of the streamer geometry from the calculator 100 is fed via lead 111 to the processed data and output store 110. These indications of the streamer geometry are interleaved with the processed digital data.

Monitors located on the vessel 12 include the ship's compass and EM log designated generally as 112, the navigation receivers 114, and the inertial platform 116. Each of these monitors provides signals to a position calculator 118. Calculator 118 provides indications of the position of the vessel 12 via a lead 120 to an input of the process data and output store circuit 110. The digital data fed from the corrector 108 is further combined, for example common depth point stacked, in a circuit 122 and fed back into the process data and output store 110. At this point, the positional information of the system is interleaved, or annotated, into the processed digital data. Store circuit 110 then provides a flow of processed data to a data quality analyzer circuit 124.

Analyzer 124 considers selected horizons from the processed data fed from the store circuit 110, and provides indications of the quality of the horizons to the adjuster circuit 76. Circuit 76 varies the number of stacks performed by stacker 74 if the quality of the horizons are below a predetermined standard. Additionally, indications of the quality of the selected horizons are provided through a connector 126 to the time varying filter command selector 98, in order that the filter setting of filters 54 may be varied in accordance with the quality of the processed digital signals.

Indications of the data quality are also fed through connection 126 to a sample rate and sequence command selector circuit 128. Selector circuit 128 evaluates the quality of the digital data in conjunction with the analyzed frequency provided by the analyzer circuit 96, in order to determine the desired sample rate and sequence of operation of the multiplexer 42 and converter 44. Circuit 128 supplies commands via conductor 133 to the command circuit 84, which optimizes the processing of the input analog data being received through cable 34.

Another output from the command selector 128, indications from circuit 76 of the number of record stacks, and indications from analyzer 124 of the quality of the digital data are supplied to a shot rate adjuster and command selector circuit 130. A command signal from circuit 130 is applied via the conductor 132 to the input of the time and merge orders command circuit 84. These commands are stored in the store 86 and distributed by the command distributor 58 in order to vary the shot firing control 26.

A second output from the shot rate command selector 130 is provided through the conductor 134 to an input of a speed and heading command circuit 136, which also receives inputs from the streamer geometry calculator 100 and the position calculator 118. By considering these three inputs with a pre-plotted course input, the speed and heading command circuit 136 provides command signals via the conductor 138 to the merge and time order command circuit 84. These commands are utilized to vary the speed and heading of the ship by controlling the circuit 26.

The processed digital data produced by the data corrector 108 and stored in the output store 110 is fed into a format system 140 and arranged according to a selected format input. This input may take on a variety of forms, such as the gapless and multiplexed formats commonly termed the TIAC format, the ESSO binary gain format, or the WESTERN binary gain format. Alternatively, gapped formats such as the UNITED binary gain format and the Ray Multiplex 12 format may be utilized to program format circuit 140. One of the distinct advantages of the present invention is the capability to allow changes of the formats to be made according to individual applications.

The formatted digital data is recorded on the magnetic tape recorder 64 to provide a permanent record of the processed digital data. Further, indications of the settings of the filters and amplifiers, in addition to indications of the monitored physical characteristics of the exploration system, may be interleaved between the recorded digital data. This record provided by recorder 46 may be transferred to a central processing station and further analyzed if desired. Read-after-write heads are provided on the magnetic tape recorder 46 in order to provide a rapid playback of the recorded digital data back through the format 140 into the processed data and output store circuit 110. This playback of the processed digital signal is fed through a lead 142 to the converter 44, where it is converted to a single channel analog signal and fed through the reversible multiplexer 42.

As previously described, the converter circuit 44 may be properly sequenced by the command distributor 58 through the lead 60 in order to simultaneously convert raw seismic data into digital signals while converting the processed digital signals to analog data. The single channel of processed analog information is fed through the reversible multiplexer 42 and is demultiplexed into a plurality of processed analog channels.

These channels are individually recorded as traces on the camera and cathode ray tube display 48. Personnel in the field may thus obtain a shot-by-shot indication of the progress of the seismic exploration. If the quality of the data is below standard, the personnel may quickly make the required adjustments without obtaining extraneous low quality data. Of course, the automatic corrections being made by the present invention will eliminate the requirement of many manual corrections.

In operation of the system when beginning the recording of data, the command distributor 58 is manually started by the insertion of selection parameters into the select circuit 150. These parameters are stored in command store 86 and sequentially sent to the desired circuit. After initialization of circuit operation, commands from the system are also sequenced by the distributor 58. After the initial cycle of the distributor 58, the process sequencer 151 takes over the process sequencing for the system, under the control of the select circuit 150.

A noise record is first taken, with commands being sent to the filters 52 and 54, to the amplifier 56 and to the multiplexer 42 in order to open these circuits and sample the noise level. The noise level is translated into digital data and is stored in the data store 64. The noise level is analyzed in circuit 80 and the desired notch filter selection is selected by the circuit 82.

Additionally, the pre-suppression gain is determined by the noise level circuit 80 and commands are sent from selector 92 to set the gain amplifier 56. If desired, the operator may manually override the selection of the pre-suppression gain and may enter an initial gain value to the amplifiers 56 through an operator's console. The amplifiers 56 will remain at the set gain until the signal input rises above a selected threshold or until a predetermined delay time, as desired. After the filters and amplifiers have been set in order to suppress the noise, the first shot is fired by operation of control 24.

The seismic reflections generated from the firing of the shot are received by the detectors 14, suitably filtered and amplified, and fed to the reversible multiplexer 42. The proper multiplexing channels are selected by the command distributor 58 and the raw seismic data is passed to the analog-to-digital converter 44. The digital output of the converter 44 is converted into floating point words by the circuit 62. In response to the output from the gain fixer circuit 62, the gain of the variable gain amplifiers 56 is continuously adjusted through the feedback circuit, in the manner previously described.

Data is stored in the data store 64 and then analyzed with respect to frequency by the analyzer 96. Commands are then sent to control the selection of the filters 54. Commands may be built into the command selector 98 in accordance with experimental shooting, in order to provide an initial basis for comparison of the frequency spectrum of the initially received signals.

The data stored in the data store 64 is processed in order to ramp out the noise bursts. A ramping function is not provided to the data by the circuit 72 until after a standard has been built into the standard comparator 68. For instance, a standard may be built from the first twelve shots and then compared with succeeding shots. The digital data is stacked by the stacker 74 to provide meaningful seismic information and is then fed to the data corrector 108 for various corrections.

The processed data is then analyzed by the quality analyzer 124 to determine the quality of the processed data, and various commands are generated in order to optimize the performance of the system. As previously described, these commands vary the filter and amplification settings, the number of records stacked, the position of the detectors, the rate of firing of the shots, and the speed and heading of the exploration system traverse.

The processed digital data is recorded by the recorder 46 to provide a permanent record thereof, and is then fed back through the digital-to-analog converter 44 and the demultiplexer 42 to be visually displayed by the camera and cathode ray tube display 48.

It will thus be understood that the present invention provides a self-contained seismic exploration unit wherein complex processing of the detected seismic data may be performed in the field, while providing a shot-by-shot indication to the field personnel of the progress of the exploration. The present invention provides automated control of various physical characteristics of the exploration system in order to optimize the quality of the processed data while simultaneously processing additional data.

What is claimed is:

1. A seismic exploration system comprising:
   (a) means for generating seismic disturbances,
   (b) detectors for generating a plurality of analog signals in response to said seismic disturbances,
   (c) circuitry for analog processing of said analog signals,
   (d) converter means for converting said processed analog signals to digital signals,
   (e) a digital computer for receiving and analyzing said digital signals, and
   (f) means responsive to said digital computer for controlling a physical characteristic of said processed analog signals in dependence upon the quality of said digital signals.

2. The system according to claim 1 wherein said means for controlling a physical characteristic of said analog signals varies the frequency spectrum of said analog signals.

3. The system according to claim 1 wherein said means for controlling a physical characteristic of said analog signals varies the amplitude of said analog signals.

4. A system for processing multi-channel analog data detected during seismic exploration comprising:
   (a) multiplexer means for transforming said multi-channel analog data to a single channel of analog data,
   (b) converter means for converting said single channel of analog data into digital data,
   (c) computer means for operating upon and processing said digital data,
   (d) recording means for recording the processed digital data,
   (e) playback means for applying a representation of said processed digital data to said converter means,
   (f) circuitry in said converter means for reconverting said processed digital data into a single channel processed analog signal and alternatingly converting additional analog data into digital data,
   (g) demultiplexer means operable in synchronism with said multiplexer means for alternatingly transforming said signal channel processed analog signal into a plurality of processed analog channels, said circuitry in said converter means performing digital to analog operations while said demultiplexer performs demultiplexing operations, and
(h) graphic display means coupled to said demultiplexer means for visibly displaying said plurality of processed analog channels.

5. The system of claim 4 and further comprising:
(a) filter means for filtering said multi-channel analog data and
(b) means operable in dependence upon said computer means for processing said digital data for controlling the operation of said filter means.

6. The system of claim 4 and further comprising:
(a) amplifier means for amplifying said multi-channel analog data, and
(b) means responsive to said computer means for processing said digital data for varying the gain of said amplifier means.

7. The method of seismic exploration comprising:
(a) generating seismic disturbances,
(b) generating analog signals in response to said seismic disturbances,
(c) processing said analog signals,
(d) converting said processed analog signals to digital signals,
(e) comparing the quality of said digital signals with predetermined standards, and
(f) varying said processed analog signals in dependence upon deviations of said digital signals from said standards.

8. The method of claim 7 and further comprising:
varying the amplitude of said processed analog signals in response to deviations of said digital signals from said standards.

9. The method of claim 7 and further comprising:
varying the frequency spectrum of said processed analog signals in response to variations of said digital signals from said standards.

10. The method of processing a plurality of channels of analog data received from seismic exploration comprising:
(a) amplifying said plurality of channels of analog data,
(b) filtering said plurality of channels of analog data,
(c) multiplexing said plurality of channels of analog data into a single channel of analog data,
(d) converting said single channel of analog data into digital data,
(e) processing by operating upon said digital data,
(f) recording the processed digital data,
(g) reconverting said processed digital data into a channel of corrected analog data,
(h) demultiplexing said channel of processed analog data into a plurality of corrected analog signal channels, and
(i) visibly recording said processed analog signal channels.

11. The method of claim 10 wherein said steps of multiplexing and demultiplexing are carried out sequentially.

12. The method of claim 10 and further comprising:
controlling characteristics of said plurality of channels of analog data in response to the quality of said digital data.

References Cited

UNITED STATES PATENTS 3,437,989   4/1969   Profitt _____ 340—15.5

RICHARD A. FARLEY, Primary Examiner

D. C. KAUFMAN, Assistant Examiner

U.S. Cl. X.R.

340—7